(12) United States Patent
Pesek et al.

(10) Patent No.: US 7,445,683 B2
(45) Date of Patent: Nov. 4, 2008

(54) THERMOPLASTIC RESIN COMPOSITIONS SUITABLE FOR USE IN LAMINATED SAFETY GLASS

(75) Inventors: Steven C. Pesek, Orange, TX (US); Sam Louis Samuels, Landenberg, PA (US); Charles Anthony Smith, Vienna, WV (US); Robert J. Cadwallader, Angier, NC (US); Richard Allen Hayes, Beaumont, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/605,118

(22) Filed: Nov. 28, 2006

(65) Prior Publication Data

US 2007/0122633 A1     May 31, 2007

Related U.S. Application Data

(60) Provisional application No. 60/742,447, filed on Nov. 30, 2005.

(51) Int. Cl.
 *B32B 17/10* (2006.01)
(52) U.S. Cl. .................. 156/106; 156/99; 428/441; 428/442
(58) Field of Classification Search .............. 156/99, 156/106; 428/441, 442
 See application file for complete search history.

(56) References Cited

U.S. PATENT DOCUMENTS

| | | | |
|---|---|---|---|
| 2,904,844 | A | 9/1959 | Smithies |
| 3,344,014 | A | 9/1967 | Rees |
| 3,404,134 | A | 10/1968 | Rees |
| 3,762,988 | A | 10/1973 | Clock et al. |
| 3,904,806 | A | 9/1975 | Waggoner |
| 4,035,549 | A | 7/1977 | Kennar |
| 4,452,840 | A * | 6/1984 | Sato et al. ............ 428/156 |
| 4,663,228 | A | 5/1987 | Bolton et al. |
| 4,668,574 | A | 5/1987 | Bolton et al. |
| 4,906,703 | A | 3/1990 | Bolton et al. |
| 5,344,513 | A | 9/1994 | Takenaka |
| 5,476,553 | A | 12/1995 | Hanoka et al. |
| 5,478,402 | A | 12/1995 | Hanoka |
| 5,580,057 | A | 12/1996 | Sullivan et al. |
| 5,759,698 | A | 6/1998 | Tanuma et al. |
| 5,763,062 | A | 6/1998 | Smith et al. |
| 5,776,012 | A * | 7/1998 | Moriyama et al. ...... 473/372 |
| 5,866,658 | A | 2/1999 | Talkowski |
| 5,895,721 | A | 4/1999 | Naoumenko et al. |
| 6,150,028 | A | 11/2000 | Mazon |
| 6,238,801 | B1 | 5/2001 | Naoumenko et al. |
| 6,329,458 | B1 | 12/2001 | Naoumenko et al. |
| 6,403,005 | B1 * | 6/2002 | Mientus et al. ........ 264/173.1 |
| 6,432,522 | B1 | 8/2002 | Friedman et al. |
| 6,660,930 | B1 | 12/2003 | Gonsiorawski |
| 6,737,151 | B1 | 5/2004 | Smith |
| 7,117,914 | B2 | 10/2006 | Chick |
| 2002/0155302 | A1 | 10/2002 | Smith et al. |
| 2003/0000568 | A1 | 1/2003 | Gonsiorawski |
| 2003/0044579 | A1 | 3/2003 | Bolton et al. |
| 2003/0124296 | A1 | 7/2003 | Smith |
| 2004/0182493 | A1 | 9/2004 | Chick |
| 2005/0164809 | A1 * | 7/2005 | Watanabe et al. ........... 473/371 |
| 2006/0141212 | A1 | 6/2006 | Smith et al. |
| 2006/0182983 | A1 | 8/2006 | Paul et al. |

FOREIGN PATENT DOCUMENTS

| | | |
|---|---|---|
| EP | 0 483 087 A1 | 4/1992 |
| EP | 0 743 175 A2 | 11/1996 |
| EP | 1 092 532 A1 | 4/2001 |
| WO | WO 99/58334 | 11/1999 |
| WO | WO 00/06619 | 2/2000 |
| WO | WO 00/64670 | 11/2000 |
| WO | WO 2004/011755 A1 | 2/2004 |
| WO | WO 2006/057771 A2 | 6/2006 |
| WO | WO 2006/063223 A2 | 6/2006 |

OTHER PUBLICATIONS

Surlyn® Product Properties Comparison Chart, http://www.dupont.com/industrial-polymers/plastics/selector/surchart.html (1995-2002).
DuPont™ Surlyn® 9520 Data Sheet (1995-2002).
DuPont™ Surlyn® 1652 Data Sheet (1995-2002).
DuPont™ Surlyn® 9020 Data Sheet (1995-2002).
DuPont™ Surlyn® 9320W Data Sheet (1995-2002).
DuPont Encapsulation Offerings—Elvax® EVA & Surlyn® Resins (2006).
DuPont™ Surlyn® Resin Industrial Resin Property Grid (2005).
DuPont™ Surlyn® Properties Chart (2005).
DuPont™ Surlyn® Extrusion Guide (2003).
DuPont Encapsulation Offerings—SentryGlas® Interlayer (2006).
DuPont™ SentryGlas® Plus Interlayer, Technical Bulletin Weathering (2005).
DuPont™ SentryGlas® Plus Interlayer, Technical Bulletin Strength Characteristics (2005).
DuPont™ SentryGlas® Plus Interlayer, Technical Bulletin Ultar-Violet Radiation Control (2005).
DuPont™ SentryGlas® Plus Interlayer, Technical Bulletin Sealant Compatibility (2005).

(Continued)

*Primary Examiner*—D. S Nakarani

(57) ABSTRACT

The present invention is a polymeric resin composition having improved toughness, suitable for use in transparent glazing, comprising an at least partially neutralized ethylene acid copolymer metal carboxylate resin, wherein the metal carboxylate consists essentially of zinc metal counter-ions.

33 Claims, No Drawings

OTHER PUBLICATIONS

DuPont™ SentryGlas® Plus Interlayer, Technical Bulletin Solar Energy Control (2005).
DuPont™ SentryGlas® Plus Interlayer, Technical Bulletin Visual Quality (2005).
DuPont™ SentryGlas® Plus Brochure (2005).
DuPont™ Surlyn® 1650 Data Sheet (1995-2002).
Himilan Japanese Language Document from http://www.mdp.jp/him/him_m_body.html & Google translation thereof (2007).
Himilan Japanese Language Document concerning resistance stress crack characteristic from http://www.mdp.jp/him/him_b_b2_03.html & Google translation thereof (2007).
PCT International Search Report and Written Opinion for International Application No. PCT/US2006/045844 dated Mar. 8, 2007.
DuPont Packaging & Industrial Polymers, DuPont™ Surlyn® 1705-1 (2004).
DuPont Packaging, Surlyn® Grade Comparison Chart (2005).
DuPont MSDS (lists both DuPont™ Surlyn® 1705-1 & 1706 resins (2005).
DuPont Packaging & Industrial Polymers, DuPont™ Surlyn® 9910 (2004).
MatWeb, The Online Materials Database, DuPont Surlyn® 1705-1 Zinc Ionomer Resin for Blown and Cast Film (1996-2007) (printed Oct. 18, 2007).
DuPont Surlyn® 1706 Ionomer Resin Product Information (1989).

* cited by examiner

THERMOPLASTIC RESIN COMPOSITIONS SUITABLE FOR USE IN LAMINATED SAFETY GLASS

CROSS REFERENCE TO RELATED APPLICATION

This application claims the benefit of U.S. Provisional Application No. 60/742,447, filed Nov. 30, 2005, which is incorporated by reference herein for all purposes as if fully set forth.

FIELD OF THE INVENTION

The present invention relates to transparent laminate articles. More specifically, the present invention relates to resin compositions suitable for use as an intermediate layer in transparent laminated safety glass.

BACKGROUND OF THE INVENTION

Glass laminated products have contributed to society for almost a century. Beyond the well known, every day automotive safety glass used in windshields, glass laminates are used in most forms of the transportation industry. They are utilized as windows for trains, airplanes, ships, and nearly every other mode of transportation. Safety glass is characterized by high impact and penetration resistance and does not scatter glass shards and debris when shattered. Glass laminates find widespread use in architectural applications, as well.

Safety glass typically consists of a sandwich of two glass sheets or panels bonded together with an interlayer of a polymeric film or sheet which is placed between the two glass sheets. One or both of the glass sheets may be replaced with optically clear rigid polymeric sheets such as, for example, sheets of polycarbonate materials. Safety glass has further evolved to include multiple layers of glass and/or polymeric sheets bonded together with interlayers of polymeric films or sheets.

The interlayer is typically made with a relatively thick polymer sheet that exhibits toughness and adheres to the glass in the event of a crack or crash. Over the years, a wide variety of polymeric interlayers have been developed to produce laminated products. In general, it is desirable that these polymeric interlayers possess acceptable levels of: optical clarity (haze of less than 4%) when laminated to glass or other clear rigid material, impact resistance, penetration resistance, ultraviolet light resistance, long term thermal stability, adhesion to glass and/or other rigid polymeric sheets, ultraviolet light transmittance, moisture absorption, moisture resistance, long term weatherability, among other characteristics. Widely used interlayer materials include complex multi-component compositions comprising polymers such as polyvinylbutyral (PVB); polyurethane (PU), polyvinylchloride (PVC), metallocene-catalyzed linear low density polyethylenes, ethylenevinyl acetate (EVA), ethylene acid copolymer ionomers, polymeric fatty acid polyamides, polyester resins such as poly(ethylene terephthalate), silicone elastomers, epoxy resins and elastomeric polycarbonates. Acid copolymers have become more widespread in their use for fabricating transparent laminates. U.S. Pat. Nos. 3,344,014; 3,404,134; 4,663,228 and 4,668,574; 4,906,703; 5,476,553; 5,478,402; 5,344,513; 5,759,698; 5,763,062; 5,895,721; 6,238,801; 6,150,028; 6,432,522; U.S. Patent Application No. 2002/0155302; U.S. Patent Application No. 2003/0044579; WO 99/58334; WO 00/64670; and WO 2004/011755; and WO 2006/057771 each discloses the use of acid copolymers and/or ionomers as interlayers in laminated glazing.

In the production of conventional ionoplastic resins and products made therefrom, particularly those used in the manufacture of safety glazing, it can be necessary to maintain control of the environmental conditions used to manufacture and store said products. Specifically, humid conditions can have deleterious effects on the properties of interlayer materials used in the manufacture of safety glazing, and on the performance of said safety glazing. These problems can be exacerbated by the tendency of conventional ionoplastic resins used in safety glazing to absorb moisture from the air.

Processes to control the environment of the manufacturing and/or storage facilities used in producing said ionoplastic resins and the products made therefrom can be complex, and such processes can be inefficient or ineffective for controlling the effect of the storage environment on said products. This can result in products of inconsistent quality and/or performance. In some instances this can result in sub-standard product that is not suitable for further use.

In safety glazing applications, there is a need to improve the adhesion of ionoplastic materials to rigid structural layers, to minimize or reduce the effect of improper storage or the lack of effective environmental controls on the performance of ionoplastic materials used in the manufacture of laminate safety glazing and to provide ionoplastic materials wherein variances in moisture content do not substantially reduce adhesion in a laminate glazing article.

SUMMARY OF THE INVENTION

In one aspect, the present invention provides an ethylene acid copolymer resin composition comprising an ethylene acid copolymer resin having from about 12 to about 30 wt % of a carboxylic acid monomer selected from acids in the group consisting of α, β-unsaturated acids having from 3 to 8 carbons, wherein about 1% to about 100% of the acid groups of the copolymer are neutralized to carboxylic acid salts comprising carboxylate ions and metal counter-ions, and wherein the metal counter-ions consist essentially of zinc ions.

In another aspect, the present invention provides a sheet suitable for use as an interlayer material in glazing, wherein the sheet is obtained from a resin composition comprising an ethylene acid copolymer having from about 12 to about 30 wt % of a carboxylic acid monomer selected from acids in the group consisting of α, β-unsaturated acids having from 3 to 8 carbons, wherein about 1% to about 100% of the acid groups of the copolymer are neutralized to carboxylic acid salts comprising carboxylate ions and metal counter-ions, and wherein the metal counter-ions consist essentially of zinc ions.

In still another aspect, the present invention provides a laminate article comprising at least one interlayer, wherein the interlayer comprises at least one layer of a sheet obtained from a resin composition comprising an ethylene acid copolymer having from about 12 to about 30 wt % of a carboxylic acid monomer selected from acids in the group consisting of α, β-unsaturated acids having from 3 to 8 carbons, wherein about 1% to about 100% of the acid groups of the copolymer are neutralized to carboxylic acid salts comprising carboxylate ions and metal counter-ions, and wherein the metal counter-ions consist essentially of zinc ions.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format."

Where applicants have defined an invention or a portion thereof with an open-ended term such as "comprising," it should be readily understood that (unless otherwise stated) the description should be interpreted to also describe such an invention using the terms "consisting essentially of" or "consisting of."

Use of "a" or "an" are employed to describe elements and components of the invention. This is done merely for convenience and to give a general sense of the invention. This description should be read to include one or at least one and the singular also includes the plural unless it is obvious that it is meant otherwise.

In one embodiment, the present invention is an ionoplast resin composition that is particularly suitable for use in the manufacture of transparent laminates. An ionoplast resin of the present invention is an ethylene acid copolymer resin comprising from about 12 wt % to about 30 wt % of an $\alpha$, $\beta$-unsaturated carboxylic acid, or functional equivalent thereof, having from 3 to 8 carbon atoms.

Suitable carboxylic acids for use herein include acrylic acid, methacrylic acid, itaconic acid, maleic acid, maleic anhydride, fumaric acid, monomethyl maleic acid, and mixtures thereof. Functional equivalents of carboxylic acids are known to one of ordinary skill in the polymer art. They include carboxylate salts, anhydrides, esters, acid halides, amides, nitriles, and similar compounds that can be converted to carboxylic acids or acid salts via hydrolysis.

Copolymers of the present invention can optionally include up to about 50 wt %, based on the total weight of the resin composition, of at least one other comonomer that is copolymerizable with ethylene and/or the unsaturated $\alpha$, $\beta$-carboxylic acid or functional equivalent thereof. Preferably the other comonomer is an unsaturated comonomer. More preferably, the ethylene copolymers of the present invention incorporate from about 0 to about 25 weight percent of the other comonomer, most preferably the ethylene copolymers of the present invention incorporate from about 0 weight percent to about 20 weight percent of the other unsaturated comonomer. Use of other comonomers is discretionary herein and, as such, use of other comonomers can be excluded. Use of an optional comonomer may not be desirable unless a benefit in the intended use can be demonstrated or determined.

Optional comonomers include alkyl acrylates, alkyl methacrylates, and mixtures thereof. Any alkyl group can be used so long as the optional comonomer does not render the copolymer composition unsuitable for the purposes contemplated herein. For example, resin compositions of the present invention can be useful as interlayers in safety glazing, and therefore optional comonomers that render a resin composition unsuitable for such use are undesirable and unsuitable for use in the practice of the present invention. One of ordinary skill in the safety glazing art would know the properties that are desirable in an interlayer material used in safety glazing. One of ordinary skill in the manufacture of polymer materials useful as interlayers in safety glazing would know the properties required of an interlayer suitable for use in safety glazing. For example, high adhesion to a rigid structural layer of a safety glazing can be an important feature, as can be the toughness of the polymeric interlayer.

Preferably, an ionoplastic resin of the present invention comprises from about 15 to about 30 wt %, more preferably from about 15 to about 25 wt %, and even more preferably from about 17 to about 23 wt % of an $\alpha$, $\beta$-unsaturated carboxylic acid having from 3 to 8 carbon atoms. ionoplast resins of the present invention have from about 1% to about 100% of the carboxylic acid groups neutralized. Preferably, the ionoplast resins of the present invention are from about 10% to about 90%, more preferably from about 10% to about 80%, more preferably from about 15% to about 45% neutralized, and still more preferably from about 20% to about 40% neutralized. Most preferably, the resin is from about 25% to about 40% neutralized. The level of neutralization is tailored to provide a balance of high glass adhesion and high laminate clarity. The neutralized acid copolymers of the present invention are neutralized with zinc-containing neutralizing agents, such that the neutralized copolymers of the present invention consist essentially of Zn cations.

The zinc-neutralized copolymers of the present invention can provide improved resistance to moisture absorption by the interlayer. Moisture absorption by the interlayer can have an effect on such important performance properties in glazing as adhesion, edge seal, delamination, or can result in visual defects that can manifest between the interlayer surface and adjoining surface. Resins of the present invention do not require as strict control of humidity and temperature as similar resins can require. Resins of the present invention also provide improved adhesion to glass compared with other ionoplastic resins having the same acid range.

Resins of the present invention can be particularly useful in glazing applications wherein transparency and/or clarity can be important factors in the usefulness of a resin as an interlayer material. In the absence of surface roughness, surface patterns, substantial surface defects, or additives intentionally added to the resin or interlayer sheeting that result in a loss of clarity or transparency, resins of the present invention can be used to obtain sheet and/or laminate articles that have haze of less than about 3%, as measured by standard methods described herein. Preferably measured haze is less than about 2%, more preferably less than about 1%, and even more preferably less than about 0.5%.

Notwithstanding the above, surface roughness and/or additives that can result in a loss of transparency or clarity can be desirable in the practice of the present invention. Therefore haze and/or transparency may not be the only measure of—or a factor in determining—the usefulness of the presently claimed invention. In most applications transparency, as measured by % transmission (% T) of light, should be at least about 40%, preferably at least about 50%, more preferably at least about 60%, and most preferably at least about 70%.

In one embodiment an interlayer of the present invention can exhibit improved toughness relative to interlayers made from other ionoplastic materials having high (>15 wt %) acid content. Without being held to theory, it is believed that improved toughness can be obtained from resins of the present invention having acid content of from 21 to 30 wt % by preparing an ethylene copolymer base resin with a lower melt index (MI) before it is neutralized. In this embodiment a base resin has a MI of about 60 grams/10 min or less as determined at 190° C. (ISO 1153, ASTM D1238), and preferably less than 55 grams/10 min. More preferably the MI is less than 50 grams/10 min. After neutralization, the MI is less than 10 grams/10 min, and preferably less than 5 g/10 min.

To aid in storage, processing or handling, ionomers of the present invention can optionally comprise an agent to prevent blocking. The use of anti-block agents or processing aids is optional in the practice of the present invention. Conventional anti-blocking agents can be used, and one of ordinary skill in the art can determine whether such agents are desirable.

In another aspect, the present invention provides a sheet obtained from a resin of the present invention. Sheets of the present invention have thicknesses of greater than about 10 mils (0.010 inch, 0.25 mm). Typically, glazing applications or similar end uses require ethylene copolymer interlayer thicknesses of greater than about 30 mils (0.75 mm) 60 mils, (1.50 mm), greater than about 90 mils, (2.25 mm), or greater than about 120 mils, (3.00 mm).

A sheet of the present invention can be obtained by known and conventional methods, or methods later developed and used for the production of sheets. Sheets suitable for use herein can be obtained by extrusion, co-extrusion, casting, blowing, or other methods known in the art, for example. For laminates of interest in the practice of the present invention, extrusion of an interlayer sheet can be preferred.

The polymeric sheet of the invention may be combined with other polymeric materials during extrusion and/or finishing to form laminates or multilayer sheets with improved characteristics. A multilayer or laminate sheet may be made by any method known in the art, and may have as many as five or more separate layers joined together by heat, adhesive and/or tie layer, as known in the art.

Extrusion of an interlayer of the present invention can be carried out at a temperature in the range of from about 175° C. to about 250° C. An interlayer sheet of the present invention can be extruded without a surface pattern, but it is preferred that an interlayer of the present invention have a surface pattern to facilitate the process of removing air or gaseous vapors from the interfacial spaces of the laminate as it is fabricated. The surface pattern can be applied either by melt fracture techniques, or by use of an embossing tool. Any surface pattern that is useful and effective for the purpose of facilitating removal of air during lamination can be useful in the practice of the present invention. Preferred surface patterns are described in US 2006-0141212. The optical clarity of an interlayer comprising a surface pattern is poor relative to the transparent laminate that is eventually obtained from the interlayer in the absence of other materials affecting the clarity of said interlayer. The lamination process can restore the optical clarity to the interlayer.

Sheets of the present invention can be combined in any combination with films and/or sheets of other materials that are compatible with the presently claimed materials. Compatible as the term is used herein shall mean that the various films and/or sheets can be combined to produce a composite laminate structure and provide a laminate that is useful as an interlayer in safety glass. This presumes that a composite laminate obtained from various films and/or sheets as can be contemplated herein will provide all of the salient features anticipated in a laminate suitable for use in safety glass applications. One of the most important features in a safety glass laminate is the stability of the laminate under stress, that is, that the laminate will not fail at an interface between the interlayer surfaces.

In the glass laminating art, it is known that increased adhesion to glass can result in a laminate with diminished impact resistance, especially for high acid content ionomers, as described above. The high acid resins of the present invention have improved adhesion but also have improved impact resistance, owing to the lower melt index of the improved resins relative to the conventional resins. Adhesion to glass, as measured by Double-Cantilever Beam (DCB) testing is greater than 200 J/m$^2$ for laminates obtained using the presently claimed resins, and yet exhibit impact toughness of greater than about 300 kJ/m$^2$. Preferably, the DCB adhesive strength is within the range of from about 200 to about 1200 J/m$^2$. Peel strength of laminates of the presently claimed invention is greater than about 6 lbs/inch to greater than 30 lbs/inch.

Finding a proper balance between adhesion and the impact toughness in the manufacture of glass laminates comprising ionoplast resins is a goal of the present invention. Toughness of the laminate can be determined by measuring the impact toughness, particularly the impact penetration. The laminates of the present invention generally provide greater penetration resistance than conventional laminates.

Additives can optionally be included in the present invention to provide other features or properties. Said optional additives can include plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers and optical brighteners. Any additives that are known and effective for the intended purpose can be optionally used in the practice of the present invention, provided that such use does not detract from the effectiveness of the present invention, so as to render the present invention unsuitable for its intended purpose.

Optional thermal stabilizers include any thermal stabilizer known in the art, with the proviso that the stabilizer will not detract from the use of the interlayer for its intended purpose. If a thermal stabilizer is used, the compositions of the present invention incorporate from about 0.01 to about 10.0 weight percent thermal stabilizers, based on the total weight of the composition. More preferably, the compositions of the present invention incorporate from about 0.01 to about 5.0 weight percent thermal stabilizers, based on the total weight of the composition. Most preferably, the compositions of the present invention incorporate from about 0.01 to about 1.0 weight percent thermal stabilizers, based on the total weight of the composition.

The compositions of the present invention can optionally incorporate an effective amount of UV absorbers. UV absorbers are well known and disclosed within the art. Any known UV absorber can find utility within the present invention. Preferable general classes of UV absorbers include benzotriazoles, hydroxybenzophenones, hydroxyphenyl triazines, esters of substituted and unsubstituted benzoic acids, and mixtures thereof.

Optional UV light stabilizers include hindered amine light stabilizers, (HALS). Hindered amine light stabilizers (HALS) are generally well disclosed within the art. Generally, hindered amine light stabilizers are disclosed to be secondary, tertiary, acetylated, N-hydrocarbyloxy substituted, hydroxy substituted N-hydrocarbyloxy substituted, or other substituted cyclic amines which further incorporate steric hindrance, generally derived from aliphatic substitution on the carbon atoms adjacent to the amine function.

If higher levels of adhesion are desired within the laminates of the present invention, optional silane coupling agents can be incorporated into the sheets or serve as coatings on the sheets of the present invention. Specific examples of the useful silane coupling agents include; gamma-chloropropylmethoxysilane, vinyltrichlorosilane, vinyltriethoxysilane, vinyltris(beta-methoxyethoxy)silane, gamma-methacryloxypropyltrimethoxysilane, beta-(3,4-epoxycyclohexyl)ethyltrimethoxysilane, gammaglycidoxypropyltrimethoxysilane, vinyl-triacetoxysilane, gamma-mercaptopropyltrimethoxysilane, gamma-aminopropyltriethoxysilane, N-beta-(aminoethyl)-gamma-aminopropyl-trimethoxysilane, and combinations thereof.

Resins of the present invention can be used in the same applications as conventional ionoplastic resins and in the same manner as those other ionoplastic materials to produce interlayers useful in safety glazing. Interlayers of the present invention can be laminated to glass or other transparent materials according to known and conventional methods, and used in conventional applications. For example, an interlayer of the present invention can be assembled with at least one other laminate structural layer, such as glass, polycarbonate, or other rigid structural layer, and laminated to the structural layer in an autoclave at a temperature above the softening point of the interlayer. Prior to lamination the structural layer, for example glass, can optionally be treated with a silane coating to promote adhesion if such treatment is desirable.

Typically, for an ionoplast interlayer, the autoclave temperature can be at least about 120° C. Preferably the autoclave temperature is at least about 125° C., and more preferably at least about 130° C.

In another aspect, the present invention provides a lamination process wherein an extruded resin of the invention can be laminated without the use of an autoclave at a temperature of less than 120° C., preferably less than 110° C., to obtain a laminate wherein the adhesion of the laminate is at least as high as that in a laminate obtained from a conventional ethylene copolymer ionomer having less than about 20 wt % acid, and which requires lamination temperatures at or above 120° C. The possibility for relatively low temperature lamination provides for the development of alternate lamination processes—such as for example press-heating, pulse heating, or pass-through oven heating—with interlayers of the present invention.

In another embodiment of the present invention, the lamination can be carried out at atmospheric pressure by application of heat and roll pressure from a nip roll, for example, or other mechanical pressure to the laminate assembly as it is heated. One of ordinary skill in the art of lamination will know how to carry out the lamination to obtain a laminate of the present invention by using the teachings of this application together with those known and practiced in the conventional art.

An interlayer suitable for use herein preferably comprises a surface pattern prior to lamination that facilitates removal of air or trapped vapors and gasses that may otherwise be trapped in the interface between the layers of the laminate after the layers are bonded. Vacuum or pressure can be applied to the laminate assembly to promote adhesion to glass and/or force out trapped gasses, but a surface pattern can facilitate the process.

Laminates of the present invention can be constructed using multiple layers of sheets obtained from resins of the present invention, and/or can comprise at least one layer having a different chemical composition from a sheet of the present invention. For example, the interlayers of the present invention can be laminated together with other conventional interlayer materials such as, for example: ionomeric interlayers having from 5 to 30 wt % acid before neutralization; EVA copolymers; polyurethanes; polyvinyl chloride polymers; or polyvinyl acetals, including polyvinyl butyrals. Laminates of the present invention may also incorporate film layers, for example biaxially oriented poly(ethylene terephthalate) (PET) films and solar control films. Preferably, the film layer surfaces have been modified to provide enhanced adhesion through, for example, surface flame or corona treatments or through the use of primers and adhesives, such as, for example, those described above or more preferably, such as poly(allyl amine). Laminates of the present invention can comprise adhesive layers to enhance adhesion between the polymeric layers and/or between polymer layers and glass. Conventional adhesives can be useful in the practice of the present invention as optional components, however any adhesive material that is currently available or developed in the future can be useful so long as the purposes of the present invention are not frustrated. Typically an interlayer of the present invention does not require an adhesive to promote adhesion to glass.

Laminates of the present invention are useful in glazing applications such as: windows in buildings; windshields and sidelites in automobiles, planes, trains, boats and other forms of transportation; structural support units such as stairs, floors, walls, partitions; other architectural units such as ceilings. Laminates of the present invention can comprise at least one rigid structural layer that is adhered to at least one interlayer obtained from the improved resin composition of the present invention. Preferred are laminates comprising at least one interlayer of the present invention with at least one layer of glass as a rigid structural layer. Laminates of the present invention are particularly useful in applications where safety glass is desirable or required. One of ordinary skill in the art of glazing manufacture, or glass lamination for safety glass applications would know and appreciate the various uses and applications of the resins and laminates described herein.

EXAMPLES

Analytical Test Methods

Compressive Shear Strength was determined through the method disclosed in U.S. Pat. No. 6,599,630 as outlined here. Six 1" by 1" (25 mm by 25 mm) chips were sawed from the laminate. The chips were conditioned in a room controlled at 23° C.±2° C. and 50 percent ±1 percent relative humidity for one hour prior to testing. A chip was placed on the cut-out on the lower half of the jig shown in FIG. 1 of U.S. Pat. No. 6,599,630, and the upper half of the jig was then placed on top of the chip. A cross-head was lowered at the rate of 0.1 inch per minute (2.5 mm per minute) until it contacted the upper piece of the device. As the cross-head continues to travel downward, one piece of glass of the chip begins to slide relative to the other. The compressive shear strength of the chip is the shear stress required to cause adhesive failure. The result reported is the average of the measurements for the six chips. The precision of this test is such that one standard deviation is typically 6 percent of the average result of six chips.

Peel testing was performed through the 90 degree peel strength adhesion test method. The laminates were peeled at a 90-degree angle using a Model SP-102B-3M90 SLIP/PEEL Tester (Instrumentors, Inc., Strongsville Ohio 44149). Unless noted otherwise, the laminates were peel at rates of 1 inch (2.5 cm) per minute.

The pummel adhsion of the samples was measured by the following procedure. A portion of the laminate, typically having dimensions of 15 by 30 cm, was cooled for 8 hours at ambient (room) temperature. It was then held in a pummel table testing machine at a 45 angle to a supporting table. A force was evenly applied over a 10 by 15 cm area of the sample with a 450-g flathead hammer at a predetermined velocity until the glass became pulverized. Once the glass pulverized, the glass that remained glued to the polymeric interlayer was compared with a list of formal standards. The pummel adhesion rating is assigned based on the amount of pulverized glass remaining adhered to the polymer according to the arbitrary scale set forth in Table I.

TABLE I

Pummel Adhesion Rating Scale

| Percentage of Glass Removed from Surface | Pummel Adhesion Rating |
|---|---|
| 100 | 0 |
| 95 | 1 |
| 90 | 2 |
| 85 | 3 |
| 60 | 4 |
| 40 | 5 |
| 20 | 6 |
| 10 | 7 |
| 5 | 8 |
| 2 | 9 |
| 0 | 10 |

The pummel test was performed on both surfaces of the laminated glass and a pummel value recorded for each surface tested. In general, good impact performance is attained at a pummel adhesion of greater than 5.

Standard Lamination Procedure

A pre-press assembly, in which the layers in the laminate are stacked in the desired order, is placed into a vacuum bag and heated at 90 to 100° C. for 30 minutes to remove any air contained between the layers of the pre-press assembly. The pre-press assembly is heated at 135° C. for 30 minutes in an air autoclave at a pressure of 200 psig (14.3 bar). The air is then cooled without adding additional gas, so that the pressure in the autoclave is allowed to decrease. After 20 minutes of cooling, when the air temperature is less than about 50° C., the excess pressure is vented, and the laminate is removed from the autoclave.

Comparative Experiment CE 1

A copoly(ethylene-co-methacrylic acid) ionomer incorporating 19 weight percent methacrylic acid that was neutralized to a level of 37 percent with sodium had a MI of 2.6 g/10 minutes, (190° C., ISO 1133, ASTM D1238). The ionomer was prepared from the corresponding poly(ethylene-co-methacrylic acid) that had a MI of 60 g/10 minutes. The neutralized ionomer was extrusion cast into sheet in the following manner. The copolymer was fed into a 1.5-inch (3.8 cm) diameter Killion extruder (Davis-Standard Killion, Pawcatuck, Conn., USA 06379) with a temperature profile:

| Extruder Zone | Temperature (° C.) |
|---|---|
| Feed | Ambient |
| Zone 1 | 160 |
| Zone 2 | 200 |
| Zone 3 | 200 |
| Block | 210 |
| Die | 210 |

Polymer throughput was controlled by adjusting the screw speed to 70 rpm. The extruder fed a 14-inch (35.6 cm) "coathanger" die with a nominal gap of 0.038 inch (0.97 mm). The as cast sheet was fed into a three roll stack consisting of a 6-inch (15.2 cm) diameter rubber nip roll covered with a Teflon® release film and two 12-inch (30.5 cm) diameter polished chrome chill rolls held at a temperature of between 10° C. and 15° C. The nominally 0.030-inch (30 mils, 0.75 mm) thick sheet was then wound onto cardboard cores at a rate of about 3.3 feet/minute (1.0 m/minute).

Comparative Experiment CE 2

A copoly(ethylene-co-methacrylic acid) ionomer 21.5 weight percent methacrylic acid that was neutralized to a level of 32.5 percent with sodium had a MI of 0.6 g/10 minutes. The ionomer was prepared from the corresponding poly(ethylene-co-methacrylic acid) that had a MI of 29 g/10 minutes. The neutralized ionomer was extrusion cast into sheet essentially as described in Comparative Experiment CE 1.

Example 1

A copoly(ethylene-co-methacrylic acid) incorporating 19 weight percent methacrylic acid that was neutralized to a level of 37 percent with zinc had a MI of 1.8 g/10 minutes. The ionomer was prepared from the corresponding poly(ethylene-co-methacrylic acid) that had a MI of 60 g/10 minutes. The neutralized ionomer was extrusion cast into sheet essentially as described in Comparative Experiment CE 1.

Example 2

A copoly(ethylene-co-methacrylic acid) incorporating 19 weight percent methacrylic acid that was neutralized to a level of 36 percent with zinc had a MI of 1.3 g/10 minutes. The ionomer was prepared from the corresponding poly(ethylene-co-methacrylic acid) that had a MI of 60 g/10 minutes. The neutralized ionomer was extrusion cast into sheet essentially as described in Comparative Experiment CE 1.

Example 3

A copoly(ethylene-co-methacrylic acid) incorporating 19 weight percent methacrylic acid that was neutralized to a level of 32 percent with zinc had a MI of 3.1 g/10 minutes. The ionomer was prepared from the corresponding poly(ethylene-co-methacrylic acid) that had a MI of 60 g/10 minutes. The neutralized ionomer was extrusion cast into sheet essentially as described in Comparative Example CE 1.

Example 4

A copoly(ethylene-co-methacrylic acid) incorporating 20.0 weight percent methacrylic acid that was neutralized to a level of 34 percent with zinc had a MI of 1.0 g/10 minutes. The ionomer was prepared from the corresponding poly(ethylene-co-methacrylic acid) that had a MI of 60 g/10 minutes. The neutralized ionomer was extrusion cast into sheet essentially as described in Comparative Example CE 1.

Example 5

A copoly(ethylene-co-methacrylic acid) incorporating 21.5 weight percent methacrylic acid that was neutralized to a level of 32 percent with zinc had a MI of 1.3 g/10 minutes. The ionomer was prepared from the corresponding poly(ethylene-co-methacrylic acid) that had a MI of 29 g/10 minutes. The neutralized ionomer was extrusion cast into sheet essentially as described in Comparative Example CE 1.

Comparative Experiment CE 3

Laminates consisting of a glass layer and the ethylene copolymer sheet produced in Comparative Experiment CE 1 were produced in the following manner. Ethylene copolymer sheets produced in Comparative Experiment CE 1 were treated in 4 different ways before pre-press assembly. Some sheets were "not conditioned", i.e., they were used as received. Others were "conditioned" by exposure to less than 8 percent relative humidity, (RH), at a temperature of 72° F. for five days, at 23 percent relative humidity, (RH), at a temperature of 72° F. for five days, or at 50 percent relative humidity, (RH), at a temperature of 72° F. for five days. Laminates were produced using ethylene copolymer sheets treated in the 4 ways described above. A glass/ethylene copolymer sheet/Teflon® film/glass pre-press assembly consisting of, in order, a clear annealed float glass plate layer, an ethylene copolymer sheet produced in Comparative Experiment CE 1 with the tin side of the glass layer in contact with the ethylene copolymer sheet, a thin Teflon® film layer and an annealed float glass plate layer (each layer measuring 6 inches by 12 inches (152 mm by 305 mm); glass layers 2.5 mm thick; ethylene copolymer sheet 30 mils, (0.75 mm) thick) was laminated according to the standard lamination procedure. Removal of the Teflon® film and the glass cover sheet provided the desired glass/ethylene copolymer sheet laminate.

Peel adhesions for the resulting laminates are shown in Table II.

Comparative Experiment CE 4

Laminates consisting of a glass layer and the ethylene copolymer sheet produced in Comparative Experiment CE 2 were produced using the method described in Comparative Experiment CE 3, with the only difference being that the ethylene copolymer sheets used were the ethylene copolymer sheets produced in Comparative Experiment CE 2.

Peel adhesions for the resulting laminates are shown in Table II. "ND" in the Table denotes "not determined".

Example 6

Laminates consisting of a glass layer and the ethylene copolymer sheet produced in Example 1 were produced using the method described in Comparative Experiment CE 3, with the only difference being that the ethylene copolymer sheets used were the ethylene copolymer sheets produced in Example 1.

Peel adhesions for the resulting laminates are shown in Table II.

Example 7

Laminates consisting of a glass layer and the ethylene copolymer sheet produced in Example 2 were produced using the method described in Comparative Experiment CE 3, with the only difference being that the ethylene copolymer sheets used were the ethylene copolymer sheets produced in Example 2.

Peel adhesions for the resulting laminates are shown in Table II.

Example 8

Laminates consisting of a glass layer and the ethylene copolymer sheet produced in Example 3 were produced using the method described in Comparative Experiment CE 3, with the only difference being that the ethylene copolymer sheets used were the ethylene copolymer sheets produced in Example 3.

Peel adhesions for the resulting laminates are shown in Table II.

Example 9

Laminates consisting of a glass layer and the ethylene copolymer sheet produced in Example 4 were produced using the method described in Comparative Experiment CE 3, with the only difference being that the ethylene copolymer sheets used were the ethylene copolymer sheets produced in Example 4.

Peel adhesions for the resulting laminates are shown in Table II.

Example 10

Laminates consisting of a glass layer and the ethylene copolymer sheet produced in Example 5 were produced using the method described in Comparative Experiment CE 3, with the only difference being that the ethylene copolymer sheets used were the ethylene copolymer sheets produced in Example 5.

Peel adhesions for the resulting laminates are shown in Table II. "ND" in the Table denotes "not determined".

TABLE II

| Example or Comparative Experiment | Not Conditioned (lbs-in.) | Peel Adhesion Conditioning At | | |
|---|---|---|---|---|
| | | <8% RH (lbs-in.) | 23% RH (lbs-in.) | 50% RH (lbs-in) |
| CE 3 | 1.4 | 6.2 | 5.3 | 3.2 |
| CE 4 | ND | 4.7 | 4.6 | 1.8 |
| 6 | 3.8 | 12.4 | 11.7 | 9.1 |
| 7 | 4.0 | 6.9 | 8.1 | 8.4 |
| 8 | 9.6 | 13.1 | 12.3 | 12.2 |
| 9 | ND | 7.3 | 7.3 | 6.7 |
| 10 | ND | 14.3 | ND | 10.8 |

Comparative Experiment CE 5

Laminates consisting of a glass layer and the ethylene copolymer sheet produced in Comparative Experiment CE 1 were produced using the method described in Comparative Experiment CE 3, with the only differences being that all the ethylene copolymer sheets used were "conditioned" according to one of the three procedures described in Comparative Experiment CE 3 and the air side of the glass layer was in contact with the ethylene copolymer sheet.

Peel adhesions for the resulting laminates are shown in Table III.

Comparative Experiment CE 6

Laminates consisting of a glass layer and the ethylene copolymer sheet produced in Comparative Experiment CE 2 were produced using the method described in Comparative Experiment CE 5, with the only difference being that the ethylene copolymer sheets used were the ethylene copolymer sheets produced in Comparative Experiment CE 2.

Peel adhesions for the resulting laminates are shown in Table III.

Example 11

Laminates consisting of a glass layer and the ethylene copolymer sheet produced in Example 1 were produced using the method described in Comparative Experiment CE 5, with the only difference being that the ethylene copolymer sheets used were the ethylene copolymer sheets produced in Example 1.

Peel adhesions for the resulting laminates are shown in Table III.

Example 12

Laminates consisting of a glass layer and the ethylene copolymer sheet produced in Example 2 were produced using the method described in Comparative Experiment CE 5, with the only difference being that the ethylene copolymer sheets used were the ethylene copolymer sheets produced in Example 2.

Peel adhesions for the resulting laminates are shown in Table III.

Example 13

Laminates consisting of a glass layer and the ethylene copolymer sheet produced in Example 3 were produced using the method described in Comparative Experiment CE 5, with the only difference being that the ethylene copolymer sheets used were the ethylene copolymer sheets produced in Example 3.

Peel adhesions for the resulting laminates are shown in Table II.

Example 14

Laminates consisting of a glass layer and the ethylene copolymer sheet produced in Example 4 were produced using the method described in Comparative Experiment CE 5, with the only difference being that the ethylene copolymer sheets used were the ethylene copolymer sheets produced in Example 4.

Peel adhesions for the resulting laminates are shown in Table II.

Example 15

Laminates consisting of a glass layer and the ethylene copolymer sheet produced in Example 5 were produced using the method described in Comparative Experiment CE 5, with the only difference being that the ethylene copolymer sheets used were the ethylene copolymer sheets produced in Example 5.

Peel adhesions for the resulting laminates are shown in Table III. "ND" in the Table denotes "not determined".

TABLE III

| Example or Comparative Experiment | Peel Adhesion Conditioning At | | |
|---|---|---|---|
| | <8% RH (lbs-in.) | 23% RH (lbs-in) | 50% RH (lbs-in) |
| CE 5 | 4.9 | 4.3 | 1.8 |
| CE 6 | 2.4 | 3.6 | 0.9 |

TABLE III-continued

Peel Adhesion

| Example or Comparative Experiment | Conditioning At | | |
|---|---|---|---|
| | <8% RH (lbs-in.) | 23% RH (lbs-in) | 50% RH (lbs-in) |
| 11 | 6.2 | 10.7 | 6.2 |
| 12 | 2.7 | 6.3 | 8.0 |
| 13 | 15.2 | 6.4 | 8.2 |
| 14 | 5.4 | 5.6 | 6.2 |
| 15 | 12.2 | ND | 6.3 |

Comparative Experiment CE 7

A copoly(ethylene-co-methacrylic acid) incorporating 21.4 weight percent methacrylic acid that was neutralized to a level of 31 percent with sodium was compression molded into plaques (6 inch by 7 inch (152 mm×178 mm) by 40 mil (1.0 mm) thick) in the following manner. The compression molding was conducted on a Carver Hydraulic Press (Carver, Inc., 1569 Morris St., Wabash, Ind., USA) at a temperature of 190° C. and a pressure of 20,000 psi. The plaques were cooled to room temperature over approximately 30 minutes. The plaques were then packaged in moisture barrier packaging.

A glass laminate consisting of a glass layer, an ethylene copolymer plaque produced in this Comparative Experiment, and a glass layer was produced in the following manner. A glass/ethylene copolymer plaque/glass pre-press assembly consisting of, in order, a clear annealed float glass plate layer, an ethylene copolymer plaque produced in this Comparative Experiment with the tin side of the glass layer in contact with the ethylene copolymer plaque, and a clear annealed float glass plate layer with the tin side of the glass in contact with the ethylene copolymer plaque (each layer measuring 6 inches by 7 inches (152 mm by 178 mm); glass layers 2.5 mm thick; ethylene copolymer plaque 40 mil (1.0 mm) thick) was laminated according to the standard lamination procedure.

The compressive shear strength of the laminate was 5095 psi. The laminate had an average pummel adhesion of 7.

Example 16

A copoly(ethylene-co-methacrylic acid) incorporating 21.4 weight percent methacrylic acid that was neutralized to a level of 32 percent with zinc was compression molded into plaques (6 inch by 7 inch (152 mm×178 mm) by 40 mil (1.0 mm) thick) using the method described in Comparative Experiment CE7. The plaques were then packaged in moisture barrier packaging.

A glass laminate consisting of a glass layer, an ethylene copolymer plaque produced in this Example, and a glass layer was produced using the method described in Comparative Experiment CE 7, with the only difference being that the ethylene copolymer plaque used was the ethylene copolymer plaque produced in this Example.

The compressive shear strength of the laminate was 5338 psi. The laminate had an average pummel adhesion of 8.

Comparative Experiment CE 8

A glass laminate consisting of a glass layer, an ethylene copolymer plaque produced using the method described in Comparative Experiment CE 7, and a glass layer was produced using the method described in Comparative Experiment CE 7, with the only difference being that the air sides of the glass layers were in contact with the ethylene copolymer plaque.

The compressive shear strength of the laminate was 4742 psi. The laminate had an average pummel adhesion of 5.

Example 17

A glass laminate consisting of a glass layer, an ethylene copolymer plaque produced using the method described in Example 16, and a glass layer was produced as described in Comparative Experiment CE 8, with the only difference being that the ethylene copolymer plaque used was the ethylene copolymer plaque produced as described in Example 16.

The compressive shear strength of the laminate was 5027 psi. The laminate had an average pummel adhesion of 8.

Comparative Experiment CE 9

A composition consisting of 99.60 weight percent of copoly(ethylene-co-methacrylic acid) incorporating 21.4 weight percent methacrylic acid which was neutralized to a level of 29 percent with sodium, 0.30 weight percent of Tinuvin® 326 stabilizer (Ciba Specialty Chemicals, Tarrytown, N.Y., USA) which was reported to be 2-(3-tert-butyl-2-hydroxy-5-methylphenyl)-5-chloro-2H-benzotriazole, (CAS Number 3896-11-5), and 0.10 weight percent of Irganox® 1010 (Ciba Specialty Chemicals, Tarrytown, N.Y., USA) which was reported to be pentaerythritol tetrakis (3,5-di-tert-butyl-4-hydroxyhydrocinnamate), (CAS Number 6683-19-8), was dry blended and then compounded on a 1 inch Killion single screw extruder (Davis-Standard Killion, Pawcatuck, Conn., 06379, USA) in the following manner. The extruder had a melt temperature of approximately 200° C. and a rate of 2.5 pounds per hour. The screw speed ranged from 47 to 70 RPM and the rear zone temperature ranged from 120° C. to 170° C. The adapter pressure ranged from 400 psi to 800 psi and power consumption ranged from about 2.5 to 3 amps. The typical extruder barrel temperature profile was:

| | |
|---|---|
| Rear (Feed Hopper) Zone: | 120 to 150° C. |
| Mid Zone: | 199 to 203° C. |
| Front Zone: | 200 to 202° C. |
| Adapter: | 200 to 201° C. |

A single strand of the product was passed through a water bath and pelletized to form small pellets. The pellets were purged with nitrogen overnight at room temperature and then sealed in a moisture barrier package.

Plaques (6 inch by 7 inch (152 mm×178 mm) by 40 mil (1.0 mm) thick) of this composition were compression molded using the method described in Comparative Experiment CE 7 and then placed in moisture barrier packaging.

Laminates consisting of a glass layer and the ethylene copolymer plaque produced in this Comparative Experiment were produced in the following manner. A glass/ethylene copolymer plaque/Teflon® film/glass pre-press assembly consisting of, in order, a clear annealed float glass plate layer, the ethylene copolymer plaque produced in this Comparative Experiment with the tin side of the glass layer in contact with the ethylene copolymer plaque, a thin Teflon® film layer and an annealed float glass plate layer was prepared by placing a plaque onto a 12 inch by 12 inch, (305 mm×305 mm), by 2.5 mm thick annealed float glass plate. A thin Teflon® film was placed on top of the ethylene copolymer plaque and a cover glass plate was place on top of the thin Teflon® film. The pre-press assembly was laminated according to the standard lamination procedure. Removal of the Teflon® film and the glass cover sheet provided the desired glass/ethylene copolymer plaque laminate.

The laminates had a peel strength of 1.5 lb/inch at a peel rate of 1 inch/min. and a peel strength of 1.5 lb/inch at a peel rate of 2 inches/min.

Example 18

A composition consisting of 99.60 weight percent of copoly(ethylene-co-methacrylic acid) incorporating 21.4 weight percent methacrylic acid which was neutralized to a level of 32 percent with zinc, 0.30 weight percent of Tinuvin® 328 stabilizer (Ciba Specialty Chemicals, Tarrytown, N.Y., USA) which was reported to be 2-(2H-benzotriazol-2-yl)-4, 6-di-tert-pentylphenol, (CAS Number 25973-55-1), and 0.10 weight percent of HP-136® stabilizer (Ciba Specialty Chemicals, Tarrytown, N.Y., USA) which was reported to be 5,7-di-tert-butyl-3-(3,4-di-methylphenyl)-3H-benzofuran-2-one, (CAS Number 181314-48-7), was dry blended, compounded, pelletized and compression molded into plaques using the methods described in Comparative Experiment CE 9. The plaques were then placed in moisture barrier packaging.

Laminates consisting of a glass layer and the ethylene copolymer plaque produced in this Example were produced using the method described in Comparative Experiment CE 9, with the only difference being that the ethylene copolymer plaque used was the ethylene copolymer plaque produced in this Example.

The laminates had a peel strength of 9.2 lb/inch at a peel rate of 1 inch/min. and a peel strength of 10.1 lb/inch at a peel rate of 2 inches/min.

Comparative Experiment CE 10

A terpoly(ethylene-co-isobutyl acrylate-co-methacrylic acid) incorporating 10 weight percent isobutyl acrylate and 10 weight percent methacrylic acid that was neutralized to a level of 73 percent with zinc was compression molded into plaques (6 inch by 7 inch (152 mm×178 mm) by 40 mil (1.0 mm) thick) using the method described in Comparative Example CE 7. The plaques were then packaged in moisture barrier packaging.

Laminates consisting of a glass layer and an ethylene terpolymer plaque produced in this Comparative Experiment were produced in the following manner. The ethylene terpolymer plaques were conditioned at 5 percent relative humidity, (RH), at a temperature of 72° F. overnight. A glass/ethylene terpolymer plaque/Teflon® film/glass pre-press assembly consisting of, in order, a clear annealed float glass plate layer, the ethylene terpolymer plaque produced in this Comparative Experiment with the tin side of the glass layer in contact with the ethylene terpolymer plaque, a thin Teflon® film layer and an annealed float glass plate layer (the glass layers measuring 6 inches by 6 inches (152 mm by 152 mm); 2.5 mm thick) was laminated according to the standard lamination procedure. Removal of the Teflon® film and the glass cover sheet provided the desired glass/ethylene copolymer sheet laminate.

The laminates had a peel adhesion of 6 lbs-in.

Example 19

Laminates consisting of a glass layer and an ethylene copolymer plaque produced as described in Example 16 were produced using the method described in Comparative Experiment CE 10, with the only difference being that the plaque used was the ethylene copolymer plaque produced as described in Example 16.

The laminates had a peel adhesion of greater than 30 lbs-in.

Comparative Experiment CE 11

Laminates consisting of a glass layer and an ethylene terpolymer plaque produced as described in Comparative Experiment CE 10 were produced using the method described in Comparative Experiment CE 10, with the only difference being that the ethylene terpolymer plaques were conditioned at 27 percent relative humidity, (RH), at a temperature of 72° F. overnight.

The laminates had a peel adhesion of 12.5 lbs-in.

Example 20

Laminates consisting of a glass layer and an ethylene copolymer plaque produced as described in Example 16 were produced using the method described in Comparative Experiment CE 11, with the only difference being that the plaque used was the ethylene copolymer plaque produced as described in Example 16.

The laminates had a peel adhesion of greater than 30 lbs-in.

What is claimed is:

1. A lamination process comprising the step of: (A) providing a first layer of an about 30 mils to about 120 mils interlayer sheet of a resin composition consisting essentially (a) an ethylene acid copolymer resin having from about 17 to about 30 wt % of carboxylic acid monomer units from acids selected from the group consisting of acrylic acid, methacrylic acid, itaconic acid, maleic acid, maleic anhydride, fumaric acid, monomethyl maleic acid, and mixtures thereof, wherein at about 1% to about 100% of the acid groups of the copolymer are neutralized to carboxylic acid salts comprising carboxylate ions and metal counter-ions, and wherein the metal counter-ions consist essentially of zinc ions; and (b) at least one additive selected from the group consisting of plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, chelating agents, coupling agents, adhesives, primers and optical brighteners; (B) providing a second layer of a sheet comprising glass or other rigid structural material; and (C) laminating the first layer to the second layer at atmospheric pressure at a temperature of less than 120° C.

2. A lamination process comprising the step of: (A) providing a first layer of an about 30 mils to about 120 mils interlayer sheet of a resin composition consisting essentially (a) an ethylene acid copolymer resin having from about 17 to about 30 wt % of carboxylic acid monomer units from acids selected from the group consisting of acrylic acid, methacrylic acid, itaconic acid, maleic acid, maleic anhydride, fumaric acid, monomethyl maleic acid, and mixtures thereof, wherein at about 1% to about 100% of the acid groups of the copolymer are neutralized to carboxylic acid salts comprising carboxylate ions and metal counter-ions, and wherein the metal counter-ions consist essentially of zinc ions; and (b) at least one additive selected from the group consisting of plasticizers, processing aides, flow enhancing additives, lubricants, pigments, dyes, flame retardants, impact modifiers, nucleating agents to increase crystallinity, antiblocking agents such as silica, thermal stabilizers, UV absorbers, UV stabilizers, dispersants, surfactants, agents, coupling agents, adhesives, primers and optical brighteners; (B) providing a second layer of a sheet comprising glass or other rigid structural material; and (C) laminating the first layer to the second layer without the use of an autoclave at a temperature of less than 110° C.

3. The process of claim 2, wherein the acids are selected from the group consisting of acrylic acid, methacrylic acid, and mixtures thereof.

4. The process of claim 3, wherein about 15% to about 45% of the acid groups of the ethylene acid copolymer are neutralized.

5. The process of claim 3, wherein about 20% to about 40% of the acid groups of the ethylene acid copolymer are neutralized.

6. The process of claim 2, further comprising extruding the resin composition to form the interlayer sheet at a temperature of about 175° C. to about 250° C.

7. The process of claim 6, wherein the second layer is a sheet of glass.

8. The process of claim 7, wherein the sheet of glass is transparent and has a light transmission of at least about 40%.

9. The process of claim 8, wherein about 15% to about 45% of the acid groups of the ethylene acid copolymer are neutralized.

10. The process of claim 9, wherein about 25% to about 40% of the acid groups of the ethylene acid copolymer are neutralized.

11. The process of claim 10, wherein the ethylene copolymer comprises from about 17 to about 25 wt % of the carboxylic acid monomer units.

12. The process of claim 11, wherein the ethylene copolymer comprises from about 17 to about 23 wt % of the carboxylic acid monomer units.

13. The process of claim 8, wherein the first layer is self-attached to the sheet of glass.

14. The process of claim 7 wherein the interlayer sheet is adhered to the sheet of glass without use of an adhesive to promote the adhesion of the interlayer sheet to the sheet of glass.

15. The process of claim 7, wherein the article further comprises a second sheet of glass laminated to the first layer.

16. The process of claim 7, wherein the acids are selected from the group consisting of acrylic acid, methacrylic acid, and mixtures thereof.

17. The process of claim 16, wherein about 15% to about 45% of the acid groups of the ethylene acid copolymer are neutralized and the ethylene copolymer comprises from about 21 to about 30 wt % of the carboxylic acid monomer units.

18. The process of claim 16, wherein about 20% to about 40% of the acid groups of the ethylene acid copolymer are neutralized and the ethylene copolymer comprises from about 21 to about 30 wt % of the carboxylic acid monomer units.

19. The process of claim 18, wherein the base resin of the copolymer has a MI of about 50 grams/10 min or less as determined at 190° C.

20. The process of claim 2, wherein the ethylene copolymer comprises from about 21 to about 30 wt % of the carboxylic acid monomer units.

21. The process of claim 20, wherein the base resin of the copolymer has a MI of about 60 grams/10 min or less as determined at 190° C.

22. The process of claim 2, wherein the second layer is a sheet of glass.

23. The process of claim 22 wherein the interlayer sheet is adhered to the glass without use of an adhesive to promote the adhesion of the interlayer sheet to the sheet of glass.

24. A lamination process comprising the steps of: (A) extruding a resin composition at a temperature of about 175° C. to about 250° C. to form an about 30 mils to about 120 mils interlayer sheet, wherein the resin composition comprises an ethylene acid copolymer resin having from about 17 to about 30 wt % of carboxylic acid monomer units from acids selected from the group consisting of acrylic acid, methacrylic acid, itaconic acid, maleic acid, maleic anhydride, fumaric acid, monomethyl maleic acid, and mixtures thereof, wherein at about 1% to about 100% of the acid groups of the copolymer are neutralized to carboxylic acid salts comprising carboxylate ions and metal counter-ions, and wherein the metal counter-ions consist essentially of zinc ions; and (B) laminating the interlayer sheet to a second layer of a sheet comprising glass or other rigid structural material at a temperature of less than 120° C. at atmospheric pressure.

25. The process of claim 24, wherein the ethylene copolymer comprises from about 21 to about 30 wt % of the carboxylic acid monomer units.

26. The process of claim 25, wherein the base resin of the copolymer has a MI of about 50 grams/ 10 min or less as determined at 190° C.

27. The process of claim 24, wherein the second layer is a sheet of glass.

28. The process of claim 27, wherein the interlayer sheet is adhered to the sheet of glass without use of an adhesive to promote the adhesion of the interlayer sheet to the sheet of glass.

29. The process of claim 28, wherein the acids are selected from the group consisting of acrylic acid, methacrylic acid and mixtures thereof.

30. The process of claim 29, wherein about 15% to about 45% of the acid groups of the ethylene acid copolymer are neutralized.

31. The process of claim 29, wherein about 20% to about 40% of the acid groups of the ethylene acid copolymer are neutralized.

32. The process of claim 24 wherein the process further comprises applying a surface pattern to the interlayer sheet by melt fracture techniques or by use of an embossing tool.

33. A lamination process comprising the steps of: (A) extruding a resin composition at a temperature of about 175° to about 250° C. to form an about 30 mils to about 120 mils interlayer sheet, wherein the resin composition comprises an ethylene acid copolymer resin having from about 17 to about 30 wt % of carboxylic acid monomer units from acids selected from the group consisting of acrylic acid, methacrylic acid, itaconic acid, maleic acid, maleic anhydride, fumaric acid, monomethyl maleic acid, and mixtures thereof, wherein at about 1% to about 100% of the acid groups of the copolymer are neutralized to carboxylic acid salts comprising carboxylate ions and metal counter-ions, and wherein the metal counter-ions consist essentially of zinc ions; and (B) laminating the interlayer sheet to a second layer of a sheet comprising glass or other rigid structural material without the use of an autoclave at a temperature of less than 110° C.

* * * * *

UNITED STATES PATENT AND TRADEMARK OFFICE
CERTIFICATE OF CORRECTION

| | | |
|---|---|---|
| PATENT NO. | : 7,445,683 B2 | Page 1 of 1 |
| APPLICATION NO. | : 11/605118 | |
| DATED | : November 4, 2008 | |
| INVENTOR(S) | : Steven C. Pesek et al. | |

It is certified that error appears in the above-identified patent and that said Letters Patent is hereby corrected as shown below:

Claim 2, column 19, line 9 should read as follows: – stabilizers, dispersants, surfactants, <u>chelating</u> agents, coupling agents Claim 33, column 20, line 50 should read as follows: – extruding a resin composition of a temperature of about 175°<u>C</u>

Signed and Sealed this

Twenty-seventh Day of September, 2011

David J. Kappos
*Director of the United States Patent and Trademark Office*